United States Patent
Rao et al.

(10) Patent No.: US 6,757,823 B1
(45) Date of Patent: Jun. 29, 2004

(54) SYSTEM AND METHOD FOR ENABLING SECURE CONNECTIONS FOR H.323 VOIP CALLS

(75) Inventors: Sanjay H. Rao, Apex, NC (US); Kenneth W. Oxendine, Raleigh, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/361,746

(22) Filed: Jul. 27, 1999

(51) Int. Cl.[7] .......................... G06F 11/30; H04L 12/16
(52) U.S. Cl. .................... 713/153; 713/170; 713/200; 370/270
(58) Field of Search ........................ 713/153, 150, 713/168, 170, 173, 181, 200; 709/227, 229; 370/260, 261, 270

(56) References Cited

U.S. PATENT DOCUMENTS

| | | | |
|---|---|---|---|
| 6,353,660 B1 * | 3/2002 | Burger et al. ............ 379/88.17 |
| 6,363,065 B1 * | 3/2002 | Thornton et al. ........... 370/352 |
| 6,373,839 B1 * | 4/2002 | Clark et al. ................. 370/352 |
| 6,421,339 B1 * | 7/2002 | Thomas ....................... 370/352 |
| 6,490,275 B1 * | 12/2002 | Sengodan .................... 370/356 |
| 6,580,695 B2 * | 6/2003 | Kluck et al. ................. 370/261 |
| 6,584,110 B1 * | 6/2003 | Mizuta et al. ............... 370/401 |

OTHER PUBLICATIONS

Toga, James and Ott, Jörg, "ITU–T Standardization Activities for Interactive Multimedia Communications on Packet-Based Networks: H.323 and Related Recommendations," Computer Networks and ISDN Systems, North Holland Publishing, Amsterdam, NL vol. 31, No. 3, Feb. 11, 1999, pp. 205–223, XP–000700319.

"Security and Encryption for H Series (H.323 and Other H.245 Based) Multimedia Termninals," ITU–T Draft Recommendation, Jan. 1998, Jan. 1998, XP–002164402.

Caronni, Germano and Lubich, Dr. Hannes P., "Proposed Security Mechanisms in the 'New' Internet," Switch Journal, Zuerich, CH, vol. 1, 1996, pp. 19–23, XP–002075076.

International Search Report for counterpart foreign application No. PCT/US00/19684.

* cited by examiner

Primary Examiner—Norman M. Wright
(74) Attorney, Agent, or Firm—Withrow & Terranova, PLLC

(57) ABSTRACT

A method of providing secure signaling connections and media connections for packet data network telephony calls. A secure registration request message containing an encryption technique and public key is sent from an originating gateway 105 over a packet data network 100 to a terminating gateway 105. The terminating gateway 105 returns a secure confirmation message containing a digital certificate over the packet data network 100 to the originating gateway 105. Once registered, further communication between the gateways 105 is encrypted over the packet data network 100 using the public key and encryption technique specified in the secure registration request message. The gateways 105 can be linked to other incompatible networks such as the PSTN 115 or wireless telephony 120 networks in order to provide telephone capability among POTS 125, wireless 130, and IP 140 phones.

24 Claims, 3 Drawing Sheets

SYSTEM AND METHOD FOR ENABLING SECURE CONNECTIONS FOR H.323 VOIP CALLS

FIELD OF THE INVENTION

The present invention relates generally to providing enhanced security for Internet telephony calls and more particularly to providing a secure connection for Voice Over IP (VoIP) calls using the H.323 protocol.

BACKGROUND OF THE INVENTION

The Internet explosion has spawned new means of data, voice, and video communication and Internet Protocol (IP) telephony is a fast developing field of telecommunications. The Internet, however, is faced with two significant obstacles to fast secure communications. The first obstacle is usable bandwidth. Bandwidth affects the rate at which data can be transferred. The second obstacle pertains to security. The Internet is not a direct point-to-point connection between computers. Rather, it is a network to which computers (or other devices) can connect for the purpose of communicating with one another. As such, there is increased opportunity for eavesdropping on data, voice, or video transmissions over the Internet. One method of enhancing the security of Internet based communications is to encrypt the data being transmitted before sending it out over the network and de-encrypting the data once it is received by the far end device.

The present invention addresses security issues with respect to Voice Over IP (VoIP) telephone calls. Currently, a call signaling channel is secured by using either a Transport Layer Security (TLS), a Secure Sockets Layer (SSL), or an IP Security Protocol (IPSec) on a secure well known port. These approaches, however, suffer from delays in call setup time, complex handshaking procedures, and significant protocol overhead. Moreover, current H.323 VoIP implementations do not prevent signaling information from being viewed by unscrupulous computer hackers on the IP network used for VoIP calls. For instance, when a SETUP message is sent over the IP network using H.323,the calling name and calling number is visible to sniffers or other such tools used on the Internet. What is needed is a method that increases security, simplifies VoIP handshaking procedures, and reduces call setup time without adding significant protocol overhead.

SUMMARY OF THE INVENTION

The present invention calls for an originating H.323 gateway to send a Secure Registration Request (SRR) message to a far end H.323 gateway prior to sending the SETUP message. An SRR message includes information requesting a secure connection as well as other parameters such as, for instance, a sender's digital certificate and an encryption algorithm. The far end H.323 gateway can either accept the SRR via a Secure Connection Confirm (SCF) message or reject the SRR via a Secure Connection Reject (SCR) message. Once an SCF message is returned, all further communication between the H.323 gateways is encrypted using a public key and encryption method specified in the SRR message. The advantages of the present invention include simplicity of use and lower call setup time than TSL, SSL, or IPSec.

In accordance with a first embodiment of the invention is a method of providing secure signaling connections for packet data network telephony calls. A secure registration request message containing an encryption technique and public key is sent from an originating gateway over a packet data network to a terminating gateway. The terminating gateway returns a secure confirmation message containing a digital certificate over the packet data network to the originating gateway. Once registered, further communication between the gateways is encrypted over the packet data network using the public key and encryption technique specified in the secure registration request message.

Other aspects and features of the present invention will become apparent to those ordinarily skilled in the art upon review of the following description of specific embodiments of the invention in conjunction with the accompanying figures.

DETAILED DISCLOSURE OF THE INVENTION

Figure 1:
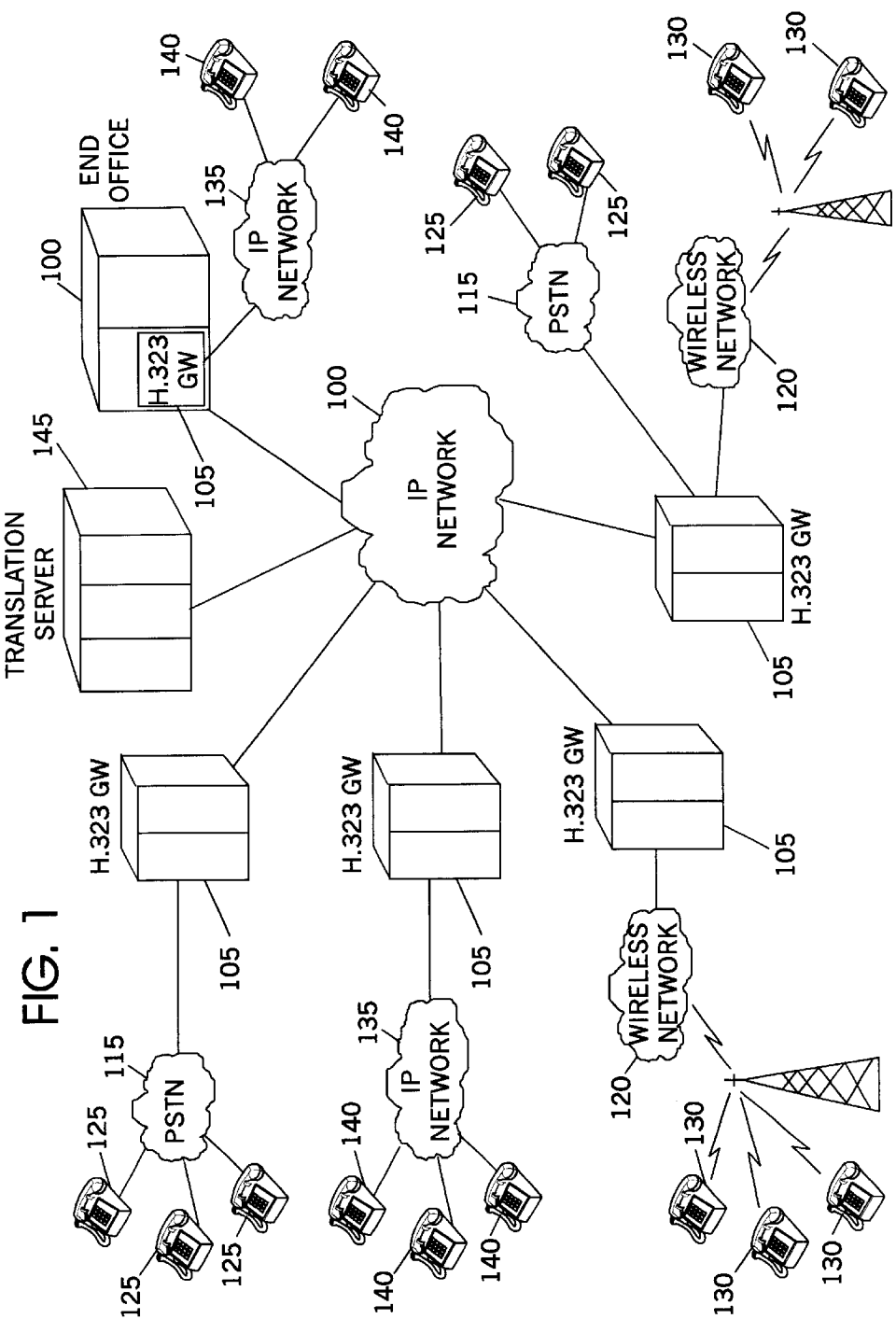
FIG. 1 illustrates one possible embodiment of a network configuration according to the present invention.

FIG. 1 is a network diagram illustrating some key components used to make VoIP telephone calls. VoIP calls are telephone calls in which at least one end user device (phone) utilizes a packet data network (e.g., the Internet) to communicate with another phone. A phone linked to a packet data network is typically referred to as an IP phone. The other phone can be another IP phone, a cellular (wireless) phone connected to a wireless telephone network, or a plain old telephone service (POTS) phone connected to a public telephone network such as the public switching telephone network (PSTN). Moreover, additional phones (IP, wireless, or POTS) may be included in a single call as in a conference call.

IP networks transmit voice data over a packet data network in discrete packets. Thus, it is a digital scheme. An analog signal (e.g., voice) is digitized and formed into data packets that are sent over the packet data network where they are reconverted to an analog signal for the end user device.

In order to allow for phone calls to travel between an IP packet data network and a circuit switched network, there must exist an interface point at which IP voice data packets are converted to the format of the circuit switched network. The entity responsible for this network interfacing is an H.323 gateway.

In general, a gateway is a node that connects two otherwise incompatible networks. Gateways can connect all sorts of incompatible networks including VoIP to PSTN, VoIP to wireless, and wireless to PSTN. In this case the Gateway(s) are responsible for connecting the PSTN and/or wireless networks with an IP network. H.323 is an ITU standard defining a set of call control, channel setup, and codec specifications for transmitting real-time audio and video over packet data networks. Thus, an H.323 gateway is an interface between packet data networks like the Internet and other networks that wish to transmit audio or video.

The present invention focuses on the secure connection aspect of the packet data network for VoIP calls. PSTN security and wireless security are beyond the scope of the present invention.

FIG. 1 illustrates an IP network 100 as the center of a VoIP call system. Connected to IP network 100 are a plurality of H.323 gateways 105. There can be virtually any number of H.323 gateways connected to the network. Moreover, an H.323 gateway can be part of, for instance, a service provider's end office 110. H.323 gateways 105 can also be connected to other incompatible networks such as a PSTN 115 or a wireless network 120. PSTN 115, in turn, is a telephone network having a plurality of POTS phones 125 connected to it. The actual complexity and scope of a PSTN network (e.g., the devices between PSTN 115 and POTS phones 125) is not illustrated as it is outside the scope of the present invention. Similarly, wireless network 120 is a telephone network having a plurality of wireless phones 130 connected to it. The actual complexity and scope of a wireless network is also not illustrated as it is outside the scope of the present invention. An H.323 gateway 105 can also be connected to another IP network 135 that is connected to an IP phone 140. H.323 gateways 105 can be configured with data about other H.323 gateways 105 on the network 100.

A translation server 145 is also connected to IP network 100. Translation server 145 maintains data pertaining to all of the H.323 gateways 105 on IP network 100. This data can be accessed by any of the H.323 gateways 105 on the network 100 when necessary such as when one H.323 gateway 105 needs to establish a connection with another H.323 gateway 105 that it was not configured with data about.

Calls made from IP phones 140 to POTS phones 125 or wireless phones 130 are routed through up to two H.323 gateways 105 in the network. The secure connection addressed by the present invention occurs between H.323 gateways 105 or between an H.323 gateway 105 and an IP phone 140 it services. Thus, even if a call uses only one H.323 gateway 105, it still faces secure connection issues that are addressed by the present invention. If a second H.323 gateway 105 is required to complete the call then a secure connection is established between the H.323 gateways 105 as well as between each H.323 gateway 105 and an IP phone 140 it is servicing.

Figure 2:
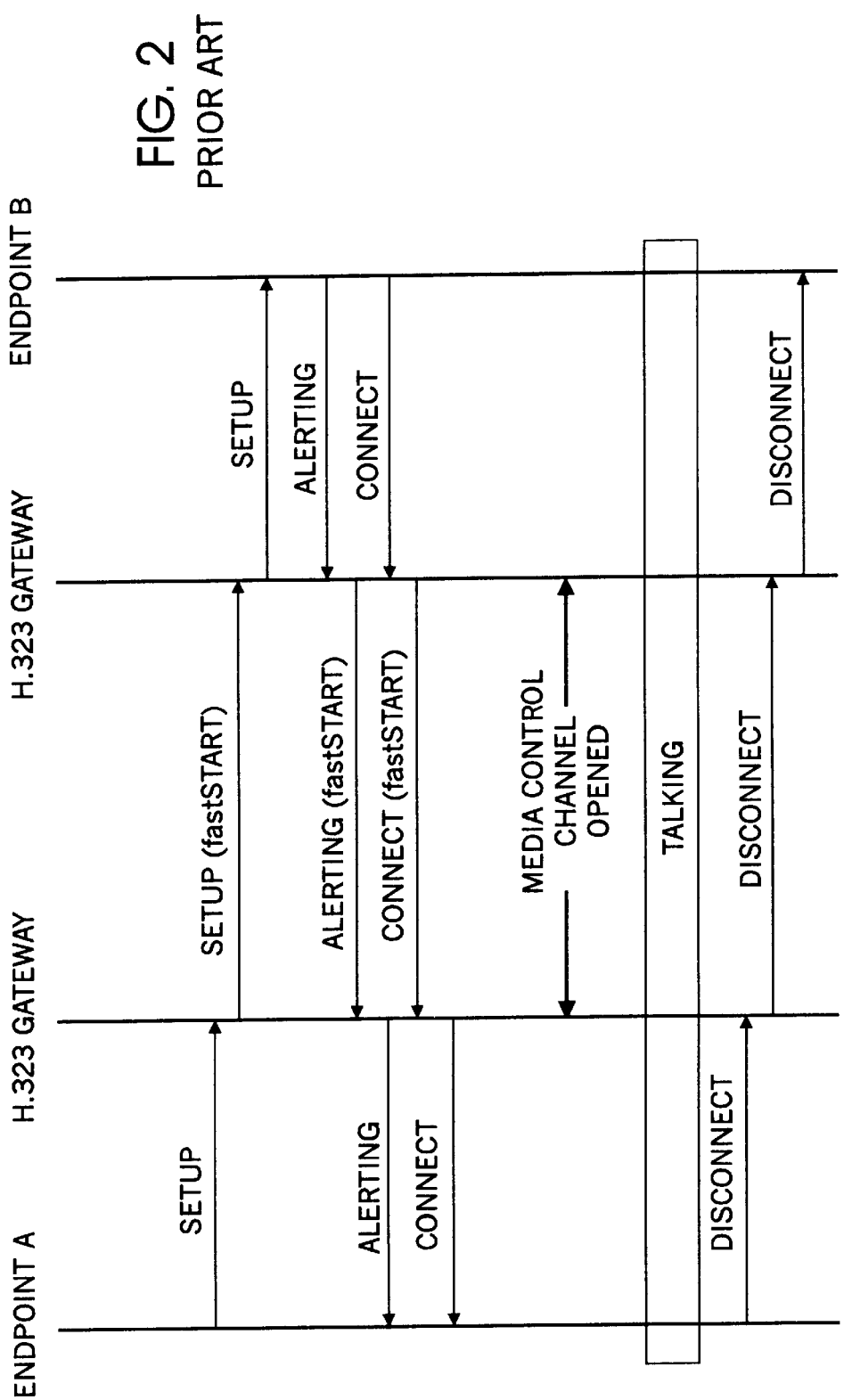
FIG. 2 is a prior art message flow diagram illustrating H.323 VoIP call messaging.

FIG. 2 is a prior art message flow diagram illustrating H.323 VoIP call setup messaging between H.323 gateways. Security between H.323 gateways is currently implemented using any one of a number of standard protocols including TLS, SSL, or IPSec. These security measures are performed on a per call basis meaning the overhead and time associated with each is performed every time a call is made between H.323 gateways. FIG. 2 depicts the call setup signaling used to make a call from one phone (endpoint A) to another phone (endpoint B). The phones can be POTS, wireless, or IP so long as the connection between them utilizes an IP network at some point.

When a user at endpoint A activates his IP phone, a SETUP message is sent from the phone to its servicing H.323 gateway. The protocol between an IP phone and an H.323 gateway is time division multiplexing (TDM) based. The endpoint A H.323 gateway then forwards a SETUP (fastStart) message to the H.323 gateway servicing endpoint B. The endpoint B H.323 gateway then forwards the SETUP message to the endpoint B phone. The endpoint B phone returns an ALERTING message to its servicing H.323 gateway. The endpoint B H.323 gateway then forwards an ALERTING (fastStart) message to the endpoint A H.323 gateway which relays an ALERTING message to the endpoint A phone. This is then followed by a CONNECT message from the endpoint B phone to the endpoint B H.323 gateway. The endpoint B H.323 gateway forwards a CONNECT(fastStart) message to the endpoint A H.323 gateway which forwards a CONNECT message to the endpoint A phone. Once this is complete, a media control channel has been opened between the H.323 gateways and the two endpoints can speak to one another. When the conversation is complete a DISCONNECT message is sent from the endpoint A phone to the endpoint A H.323 gateway. The DISCONNECT message is relayed to the endpoint B H.323 gateway and on to the endpoint B phone thereby terminating the connection.

Figure 3:
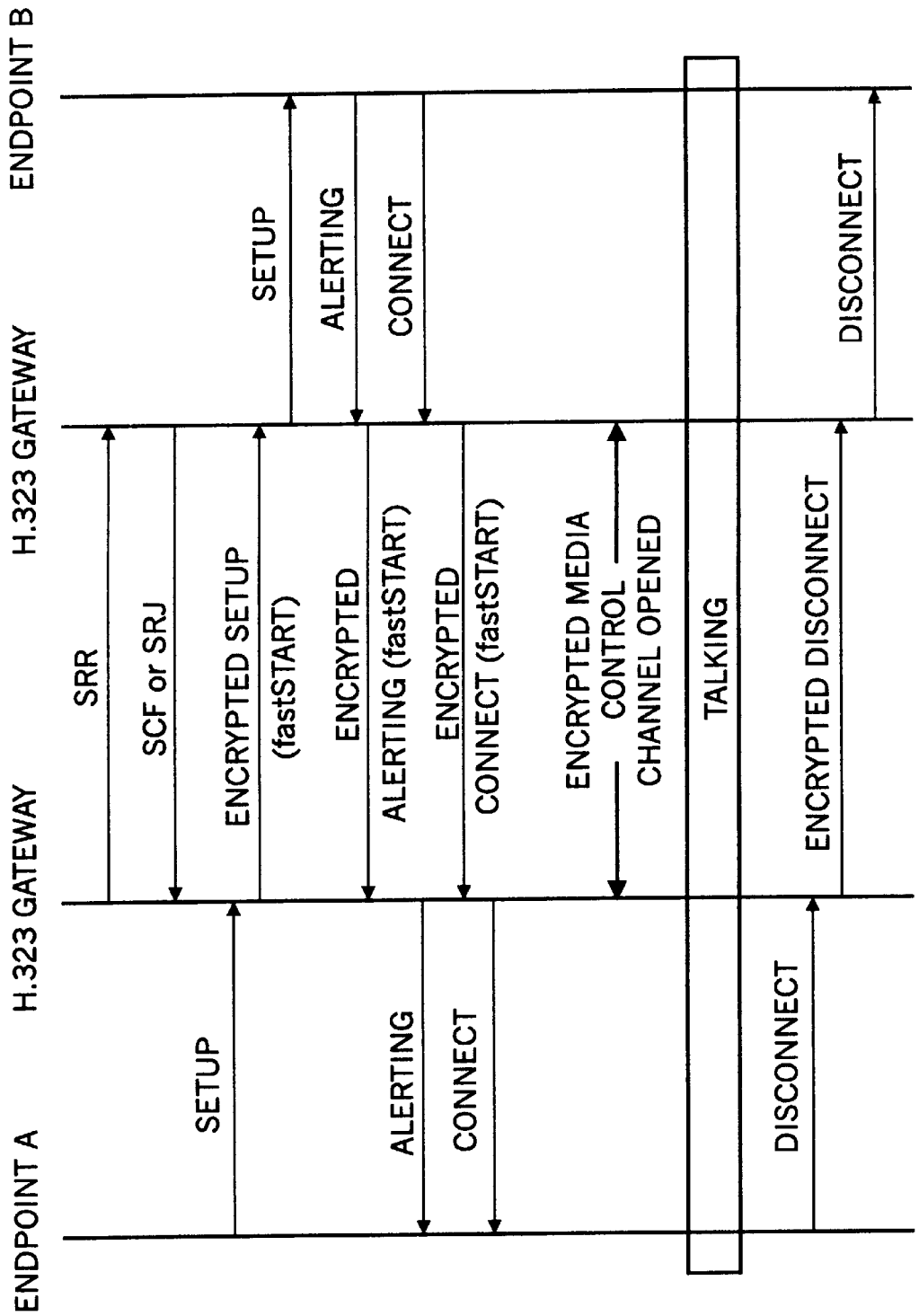
FIG. 3 is a message flow diagram illustrating secure H.323 VoIP call messaging according to the present invention.

FIG. 3 is a message flow diagram illustrating secure H.323 VoIP call setup messaging between H.323 entities according to the present invention. H.323 entities include H.323 gateways as well as IP phones. Endpoints A and B can be IP phones, wireless phones, or POTS phones. At least one network between the endpoints is a packet data network utilizing the H.323 call protocol.

Under the present invention, H.323 gateways perform a secure registration process in which they exchange information among themselves or with a translation server associated with the IP network. The essence of the information exchanged includes encryption algorithms and public key data. The exchange occurs as part of the configuration or setup of an H.323 gateway such as when an H.323 gateway is powered up or upon its joining an H.323 zone. An H.323 zone is a collection of endpoints. Typically, this means gateways and IP phones with no more than one gatekeeper. The information exchange begins when a new H.323 gateway sends a Secure Registration (SRR) message to another H.323 gateway that has already been configured in the IP network or to the translation server. In general, an SRR message is a request for a public key and associated encryption algorithm to be used in future communication between the H.323 gateways.

The format of the SRR message includes the parameters requestSeqNum, protocolIdentifier, nonStandardData, sendersCertificate, keyExchange, digitalSignature, Tokens, cryptoTokens, mediaEncryption, and integrityCheckSum. The requestSeqNum parameter is a monotonically increasing number unique to a sender. It is returned by the receiver in any messages associated with this specific message. The protocolIdentifier parameter identifies the H.225.0 vintage of the sending point. H.225 is a call signaling protocol and media stream packetization scheme for packet-based multimedia communication systems. The nonStandardData parameter carries other information such as proprietary data. The sendersCertificate parameter is the digital certificate of the sender. The keyExchange parameter is an algorithm and associated parameters used in a public key exchange between H.323 gateways or between an IP Phone and an H.323 gateway. The digitalSignature parameter is an optional parameter containing the digital signature of the sender. The Tokens parameter refers to data that may be required to permit an operation. Such data is inserted into a message if available. The cryptoTokens parameter refers to encrypted tokens. The mediaEncryption parameter is a Boolean type parameter used to indicate if the H.323 gateway should also encrypt the media (voice). The integrityCheckSum parameter provides improved message integrity/message authentication.

A digital certificate is a document attesting to the binding of a public key to an individual or other entity. Digital certificates allow verification of a claim that a specific public key does in fact belong to a specific individual. In their simplest form, a digital certificate includes a public key and a name. Digital certificates are issued by a certifying authority which can be any trusted central administration entity willing to vouch for the identities of those it issues certificates to as well as their association with a given public key. Examples include a company that issues digital certificates to its employees, a university that issues digital certificates to its students, or a town that issues digital certificates to its citizens.

An SRR message need only be issued once which can be, for example, on initial boot (e.g., power up of an H.323 gateway or IP Phone) or upon joining an IP network. A new digital certificate results in a new SRR message. A new digital certificate may be required if an H.323 gateway determines that its current digital certificate has been compromised. The H.323 gateway can acquire a new digital certificate from the issuing authority. In such a case, the other H.323 gateways need to be informed of the new digital certificate. Hence the need for a new SRR message.

When an H.323 gateway or translation server receives an SRR message from another H.323 gateway seeking to join the IP network, it can respond in one of two ways. One is to return a Secure Confirmation (SCF) message accepting the new H.323 gateway into the IP network. The other is to return a Secure Connection Reject (SRJ) message not accepting the new H.323 gateway into the IP network.

If an SCF message is returned, then calls are processed according to the illustration in FIG. 2. Note, however, that all messaging between H.323 gateways is encrypted including the actual conversation between the parties. This includes the initial messaging (SETUP, ALERTING, CONNECT) establishing the connection between the endpoints. The encryption data used to secure the connection was exchanged during the registration process. Thus, computer hackers can no longer view call information such as calling name and calling number.

The format of the SCF message includes the parameters requestSeqNum, protocolIdentifier, nonStandardData, acceptorCertificate, digitalSignature, Tokens, cryptoTokens, mediaEncryption, and integrityCheckValue. The requestSeqNum parameter is a monotonically increasing number unique to a sender. It is returned by the receiver in any messages associated with this specific message. The protocolIdentifier parameter identifies the vintage of the accepting point. The nonStandardData parameter carries other information such as proprietary data. The acceptorCertificate parameter is the digital certificate of the acceptor. The digitalSignature parameter is an optional parameter containing the digital signature of the acceptor. The Tokens parameter refers to data that may be required to permit an operation. Such data is inserted into a message if available. The cryptoTokens parameter refers to encrypted tokens. The mediaEncryption parameter is a Boolean type parameter used to indicate if the H.323 gateway should also encrypt the media (voice).The integrityCheckValue parameter provides improved message integrity/message authentication.

If an SRJ message is returned then the H.323 gateway seeking secure registration is not recognized and secure communications involving that H.323 gateway are not possible. An H.323 gateway could reject a registration request for any number of reasons including, but not limited to, an invalid digital certificate or no support for the encryption algorithms included with the SRR message.

The format of the SRJ message includes the parameters requestSeqNum, protocolIdentifier, nonStandardData, rejectReason, Tokens, cryptoTokens, and integrityCheckValue. The requestSeqNum parameter is a monotonically increasing number unique to a sender. It is returned by the receiver in any messages associated with this specific message. The protocolIdentifier parameter identifies the H.225.0 vintage of the sending point. The nonStandardData parameter carries other information such as proprietary data. The rejectReason parameter includes the reason for the rejection of the registration request. The Tokens parameter refers to data that may be required to permit an operation. Such data is inserted into a message if available. The cryptoTokens parameter refers to encrypted tokens. The integrityCheckValue parameter provides improved message integrity/message authentication.

The Secure Registration Request (SRR), Secure Connection Confirm (SCF), and Secure Connection Reject (SRJ) messages are new messages. That is, they are not a part of the current H.323 messaging protocol and would need to be implemented into H.323 protocol and universally implemented.

It is to be understood that the present invention illustrated herein is readily implementable by those of ordinary skill in the art as a computer program product having a medium with a computer program embodied thereon. The computer program product is capable of being loaded and executed on the appropriate computer processing device(s) in order to carry out the method or process steps described. Appropriate computer program code in combination with hardware implements many of the elements of the present invention. This computer code is often stored on storage media. This media can be a diskette, hard disk, CD-ROM, optical storage media, or tape. The media can also be a memory storage device or collection of memory storage devices such as read-only memory (ROM) or random access memory (RAM). Additionally, the computer program code can be transferred to the appropriate hardware over some type of data network.

The present invention has been described, in part, with reference to message diagrams. It will be understood that each message diagram can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the message diagrams.

These computer program instructions may also be stored in a computer-readable memory that can direct a computer or other programmable data processing apparatus to function in a particular manner, such that the instructions stored in the computer-readable memory produce an article of manufacture including instruction means which implement the functions specified in the message diagrams. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the message diagrams.

Accordingly, message diagrams support combinations of means for performing the specified functions, combinations of steps for performing the specified functions and program instruction means for performing the specified functions. It will also be understood that each message diagram can be implemented by special purpose hardware-based computer systems that perform the specified functions or steps, or combinations of special purpose hardware and computer instructions.

In the following claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method of providing secure signaling connections for packet data network telephony calls comprising:
   prior to call initiation:
      sending a secure registration request message containing an encryption technique and public key from a sender gateway over a packet data network to an acceptor gateway;
      returning a secure confirmation message containing a digital certificate from the acceptor gateway over the packet data network to the sender gateway; and
      conducting encrypted data exchanges between the sender and acceptor gateways over the packet data network using the public key and encryption technique specified in the secure registration request message.

2. The method of claim 1 in which the secure registration request message is sent by the sender gateway when it is powered up.

3. The method of claim 1 in which the secure registration request message is sent by the sender gateway when it initially joins the packet data network.

4. The method of claim 1 in which the secure registration request message is comprised of:
   a requestSeqNum parameter to be returned by the acceptor gateway in all messages associated with the secure registration request message;
   a protocolIdentifier parameter for identifying the H.225.0 vintage of the sender gateway;
   a sendersCertificate parameter containing the digital certificate of the sender gateway; and
   a keyExchange parameter containing the encryption algorithm and public key to be used in data exchanges between the sender and acceptor gateways.

5. The method of claim 1 in which the secure confirmation message is comprised of:
   a requestSeqNum parameter to be returned by the acceptor gateway in all messages associated with the secure registration request message;
   a protocolIdentifier parameter for identifying the H.225.0 vintage of the acceptor gateway; and
   an acceptorCertificate parameter containing the digital certificate of the acceptor gateway.

6. A method of providing secure signaling connections for packet data network telephony calls comprising:
   prior to call initiation:
      in a gateway, receiving a secure registration request message containing an encryption technique and public key over a packet data network from an IP phone;
      returning a secure confirmation message containing a digital certificate from the gateway over the packet data network to the IP phone; and
      conducting encrypted data exchanges between the IP phone and the gateway over the packet data network using the public key and encryption technique specified in the secure registration request message.

7. The method of claim 6 in which the secure registration request message is sent by the IP phone when it is powered up.

8. The method of claim 6 in which the secure registration request message is sent by the IP phone when it initially joins the packet data network.

9. The method of claim 6 in which the secure registration request message is comprised of:
   a requestSeqNum parameter to be returned by the gateway in all messages associated with the secure registration request message;
   a protocolIdentifier parameter for identifying the H.225.0 vintage of the IP phone;
   a sendersCertificate parameter containing the digital certificate of the IP phone;
   a keyExchange parameter containing the encryption algorithm and public key to be used in data exchange between the IP phone and gateway; and
   a mediaEncryption parameter to determine whether the gateways should encrypt the media.

10. The method of claim 6 in which the secure confirmation message is comprised of:
    a requestSeqNum parameter to be returned by the gateway in all messages associated with the secure registration request message;
    a protocolIdentifier parameter for identifying the H.225.0 vintage of the gateway;
    an acceptorCertificate parameter containing the digital certificate of the gateway; and
    a mediaEncryption parameter to determine whether the gateways should encrypt the media.

11. A gateway for providing secure signaling connections for packet data network telephony calls operating under control of a computer program, said computer program using computer program code comprised of:
    computer program code operative prior to call initiation and comprising:
       computer program code for sending a secure registration request message from a sender gateway over a packet data network to an acceptor gateway, said secure registration request message containing an encryption technique and public key;
       computer program code for receiving a secure confirmation message over the packet data network to the sender gateway, said secure confirmation message containing a digital certificate from the acceptor gateway; and
       computer program code for conducting encrypted data exchanges between the sender and acceptor gateways over the packet data network using the public key and encryption technique specified in the secure registration request message.

12. The gateway of claim 11 in which the secure registration request message is sent by the sender gateways when it is powered up.

13. The method of claim 11 in which the secure registration request message is sent by the sender gateway when it initially joins the packet data network.

14. The method of claim 11 in which the secure registration request message is comprised of:
    computer program code representing a unique parameter to be returned by the acceptor gateway in all messages associated with the secure registration request message;

computer program code for identifying the H.225.0 vintage of the sender gateway;
computer program code containing a parameter with the digital certificate of the sender gateway; and
computer program code containing the encryption algorithm and public key to be used in data exchanges between the sender and acceptor gateways.

15. The method of claim 11 in which the secure confirmation message is comprised of:
computer program code representing a unique parameter to be returned by the acceptor gateway in all messages associated with the secure registration request message;
computer program code for identifying the H.225.0 vintage of the acceptor gateway; and
computer program code containing a parameter with the digital certificate of the acceptor gateway.

16. A programmable gateway including computer program code for providing secure signaling connections for packet data network telephony calls comprising:
computer program code operative prior to call initiation and comprising:
computer program code for receiving secure registration request message containing an encryption technique and public key over packet data network from an IP phone;
computer program code for returning a secure confirmation message containing a digital certificate over the packet data network to the IP phone; and
computer program code for conducting encrypted data exchanges with the IP phone over the packet data network using the public key and encryption technique specified in the secure registration request message.

17. A gateway for providing secure signaling and media connections for packet data network telephony calls operating under control of a computer program, said computer program using computer program code comprised of:
computer program code operative prior to call initiation and comprising:
computer program code for sending a secure registration request message from a sender gateway over a packet data network to an acceptor gateway, said secure registration request message containing an encryption technique and public key;
computer program code for receiving secure confirmation message over the packet data network to the sender gateway, said secure confirmation message containing a digital certificate from the acceptor gateway; and
computer program code for conducting encrypted data and media exchanges between the sender and acceptor gateways over the packet data network using the public key and encryption technique specified in the secure registration request message.

18. The method of claim 17 in which the secure registration request message is comprised of:
computer program code representing a unique parameter to be returned by the acceptor gateway in all messages associated with the secure registration request message;
computer program code for identifying the H.225.0 vintage of the sender gateway;
computer program code containing a parameter with the digital certificate of the sender gateway;
computer program code containing the encryption algorithm and public key to be used in data exchanges between the sender and acceptor gateways; and
computer program code containing a parameter used to determine whether the gateways should encrypt the media.

19. The method of claim 17 in which the secure confirmation message is comprised of:
computer program code representing a unique parameter to be returned by the acceptor gateway in all messages associated with the secure registration request message;
computer program code for identifying the H.225.0 vintage of the acceptor gateway;
computer program code containing a parameter with the digital certificate of the acceptor gateway; and
computer program code containing a parameter used to determine whether the gateways should encrypt the media.

20. A method of providing secure signaling and media connections for packet data network telephony calls comprising:
prior to call initiation:
sending a secure registration request message containing an encryption technique and public key from a sender gateway over a packet data network to an acceptor gateway;
returning a secure confirmation message containing a digital certificate from the acceptor gateway over the packet data network to the sender gateway; and
conducting encrypted data and media exchanges between the sender and acceptor gateways over the packet data network using the public key and encryption technique specified in the secure registration request message.

21. The method of claim 20 in which the secure registration request message is sent by the sender gateway when it is powered up.

22. The method of claim 20 in which the secure registration request message is sent by the sender gateway when it initially joins the packet data network.

23. The method of claim 20 in which the secure registration request message is comprised of:
a requestSeqNum parameter to be returned by the acceptor gateway in all messages associated with the secure registration request message,
a protocolIdentifier parameter for identifying the H.225.0 vintage of the sender gateway;
a sendersCertificate parameter containing the digital certificate of the sender gateway;
a keyExchange parameter containing the encryption algorithm and public key to be used in data exchanges between the sender and acceptor gateways; and
a mediaEncryption parameter to determine whether the gateways should encrypt the media.

24. The method of claim 20 in which the secure confirmation message is comprised of:
a requestSeqNum parameter to be returned by the acceptor gateway in all messages associated with the secure registration request message;
a protocolIdentifier parameter for identifying H.225.0 vintage of the acceptor gateway;
an acceptorCertificate parameter containing the digital certificate of the acceptor gateway; and
a mediaEncryption parameter to determine whether the gateways should encrypt the media.

* * * * *